United States Patent
Heise

(10) Patent No.: US 9,781,115 B2
(45) Date of Patent: *Oct. 3, 2017

(54) SYSTEMS AND METHODS FOR AUTHENTICATING NODES

(71) Applicant: Facebook, Inc., Menlo Park, CA (US)

(72) Inventor: Stephen Charles Heise, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 288 days.

This patent is subject to a terminal disclaimer.

(21) Appl. No.: 14/746,566

(22) Filed: Jun. 22, 2015

(65) Prior Publication Data

US 2015/0288696 A1    Oct. 8, 2015

Related U.S. Application Data

(63) Continuation of application No. 14/018,356, filed on Sep. 4, 2013, now Pat. No. 9,094,389.

(51) Int. Cl.
| | | |
|---|---|---|
| *H04L 29/06* | (2006.01) | |
| *G06F 17/30* | (2006.01) | |
| *H04L 29/08* | (2006.01) | |

(52) U.S. Cl.
CPC ........ *H04L 63/10* (2013.01); *G06F 17/30958* (2013.01); *H04L 63/08* (2013.01); *H04L 63/0876* (2013.01); *H04L 63/126* (2013.01); *H04L 65/403* (2013.01); *H04L 67/10* (2013.01); *H04L 67/306* (2013.01)

(58) Field of Classification Search
CPC ..... H04L 63/10; H04L 67/306; H04L 65/403; H04L 67/10; H04L 63/0876; H04L 63/126; H04L 63/08; G06F 17/30958
See application file for complete search history.

(56) References Cited

U.S. PATENT DOCUMENTS

| | | | |
|---|---|---|---|
| 7,805,518 B1 | 9/2010 | Kamvar et al. | |
| 8,370,389 B1 * | 2/2013 | Dotan | G06F 21/43 707/781 |
| 8,595,146 B1 | 11/2013 | Liew | |

(Continued)

OTHER PUBLICATIONS

Ugander, Johan et al., "Balanced Label Propagation for Partitioning Massive Graphs," Proceedings of the Sixth ACM International Conference on Web Search and Data Mining (WSDM '13), pp. 507-516, Feb. 4, 2013.

*Primary Examiner* — Darren B Schwartz
(74) *Attorney, Agent, or Firm* — Sheppard Mullin Richter & Hampton LLP

(57) ABSTRACT

To authenticate nodes, a connection between a first node and a second node may be identified. A first set of nodes having connections with the first node and assigned to a first plurality of clusters may be identified. A second set of nodes having connections with the second node and assigned to a second plurality of clusters may be identified. A first distribution of clusters may be generated based on the first set of nodes. A second distribution of clusters may be generated based on the second set of nodes. The first distribution and the second distribution may be analyzed. An authenticity metric for at least one of the first node and the second node may be generated based on the analyzing the first distribution and the second distribution.

20 Claims, 7 Drawing Sheets

(56) References Cited

U.S. PATENT DOCUMENTS

| | | | |
|---|---|---|---|
| 8,601,547 B1* | 12/2013 | Shen | G06F 21/554 713/161 |
| 2003/0069820 A1* | 4/2003 | Hillmer | G06Q 20/206 705/35 |
| 2006/0021009 A1 | 1/2006 | Lunt | |
| 2006/0042483 A1 | 3/2006 | Work et al. | |
| 2006/0248573 A1 | 11/2006 | Pannu et al. | |
| 2007/0226248 A1 | 9/2007 | Darr | |
| 2008/0201447 A1 | 8/2008 | Kim | |
| 2008/0256602 A1 | 10/2008 | Pagan | |
| 2009/0216859 A1 | 8/2009 | Dolling | |
| 2010/0132049 A1 | 5/2010 | Vernal et al. | |
| 2010/0205430 A1 | 8/2010 | Chiou et al. | |
| 2011/0113101 A1 | 5/2011 | Ye et al. | |
| 2011/0125845 A1 | 5/2011 | Mo et al. | |
| 2011/0137789 A1 | 6/2011 | Kortina et al. | |
| 2011/0218948 A1 | 9/2011 | De Souza et al. | |
| 2012/0131171 A1* | 5/2012 | Samuel | G06Q 50/01 709/224 |
| 2012/0158851 A1* | 6/2012 | Kelmenson | G06F 17/30864 709/205 |
| 2012/0159647 A1 | 6/2012 | Sanin et al. | |
| 2012/0166533 A1 | 6/2012 | Rubinstein et al. | |
| 2012/0226701 A1* | 9/2012 | Singh | G06F 21/40 707/748 |
| 2012/0246720 A1 | 9/2012 | Xie et al. | |
| 2012/0310831 A1 | 12/2012 | Harris et al. | |
| 2013/0007151 A1 | 1/2013 | Chen et al. | |
| 2013/0013682 A1 | 1/2013 | Juan et al. | |
| 2013/0133048 A1* | 5/2013 | Wyn-Harris | H04L 63/0861 726/5 |
| 2013/0282819 A1 | 10/2013 | Mehta et al. | |
| 2014/0040170 A1* | 2/2014 | Zheng | H04L 63/1408 706/12 |
| 2014/0045456 A1* | 2/2014 | Ballai | H04W 12/12 455/410 |
| 2014/0250221 A1 | 9/2014 | Boggs et al. | |
| 2014/0317736 A1 | 10/2014 | Cao et al. | |

* cited by examiner

300

| | Friends | | | | | | | | | | | | | | | | | |
|---|---|---|---|---|---|---|---|---|---|---|---|---|---|---|---|---|---|---|
| REQ | 5 | 12 | 17 | 33 | 38 | 64 | 2 | 13 | 18 | 70 | | | | | | | | |
| Target | | | | | | | | | | | 16 | 31 | 55 | 27 | 23 | 61 | 59 | 4 | 11 |
| CL ID | 1 | 2 | 1 | 3 | 3 | 2 | 2 | 1 | 6 | 2 | 5 | 5 | 3 | 2 | 2 | 1 | 4 | 1 | 2 |

| | CL 1 | CL 2 | CL 3 | CL 4 | CL 5 | CL 6 | ... | Cl n | TOP 1 | TOP 2 | TOP 3 |
|---|---|---|---|---|---|---|---|---|---|---|---|
| REQ | 3 | 4 | 2 | 0 | 0 | 1 | ... | 0 | CL2 | CL1 | CL3 |
| TARGET | 2 | 3 | 1 | 1 | 2 | 0 | ... | 0 | CL2 | CL5 | CL1 |

FIGURE 3B

SYSTEMS AND METHODS FOR AUTHENTICATING NODES

CROSS-REFERENCE TO RELATED APPLICATIONS

This application is a continuation of U.S. patent application Ser. No. 14/018,356, filed on Sep. 4, 2013 and entitled "SYSTEMS AND METHODS FOR AUTHENTICATING NODES", which is incorporated in its entirety herein by reference.

FIELD OF THE INVENTION

The present invention relates to the field of authentication. More particularly, the present invention provides techniques for authenticating nodes based on clustering.

BACKGROUND

Social networking websites provide a dynamic environment in which members can connect to and communicate with other members. These websites may commonly provide online mechanisms allowing members to interact within their preexisting social networks, as well as create new social networks. Members may include any individual or entity, such as an organization or business. Among other attributes, social networking websites allow members to effectively and efficiently communicate relevant information to their social networks.

Members of a social network may form connections, such as friendships, with other members in the social network. Friendships may enable members to have access to each other's social networking account. For example, a friendship may provide access to a member's personal information, news stories, relationship activities, music, videos, and any other content of interest to areas of the website dedicated to the member or otherwise made available for such content. Upon access to and consideration of the content, the members may react by taking one or more responsive actions, such as providing feedback or an opinion about the content. The ability of members to interact in this manner fosters communications among them and helps to realize the goals of social networking websites. In some cases, members may be able to assign friends to a restricted list that restricts the level of access that the friend has to their account.

In some cases, some members may falsely represent their identities to access other members. For example, spammers pretending to be an acquaintance may send friend requests to a large number of members in hopes of gaining access to and forming relationships with the members. Once access is gained, the spammers may exploit the relationships with the members by interacting with the members in inappropriate ways. One type of inappropriate interaction is the provision of uninvited advertising or other types of information. The attempted formation of relationships premised on false representations is inconsistent with the spirit of social networks and the intentions of legitimate members.

SUMMARY

To authenticate nodes, computer implemented methods, systems, and computer readable media, in an embodiment, may identify a connection between a first node and a second node. A first set of nodes having connections with the first node and assigned to a first plurality of clusters may be identified. A second set of nodes having connections with the second node and assigned to a second plurality of clusters may be identified. A first distribution of clusters may be generated based on the first set of nodes. A second distribution of clusters may be generated based on the second set of nodes. The first distribution and the second distribution may be analyzed. An authenticity metric for at least one of the first node and the second node may be generated based on the analyzing the first distribution and the second distribution.

In an embodiment, the connection between the first node and the second node may be a pending connection.

In an embodiment, the authenticity metric may be based on a number of common clusters associated with the first distribution and the second distribution.

In an embodiment, the authenticity metric may be indicative of authenticity when the number of common clusters associated with the first distribution and the second distribution is equal to or greater than a predetermined value.

In an embodiment, a confidence level associated with the authenticity metric may be generated based on a number of nodes in the first set of nodes.

In an embodiment, the first distribution may be based on established connections between the first set of nodes and the first node.

In an embodiment, the first distribution may be based on pending connections between the first set of nodes and the first node when the established connections are indicative of a low confidence level.

In an embodiment, a confidence level associated with the authenticity metric may be generated based on an entropy calculation for the first set of nodes.

In an embodiment, a first cluster associated with the first node may be identified. A third distribution of clusters associated with the first cluster may be generated. The third distribution may be substituted for the first distribution.

In an embodiment, the generating of the third distribution of clusters may include identifying nodes of the first cluster. The third set of nodes having connections with the nodes of the first cluster and assigned to a third plurality of clusters may be identified. The third distribution of clusters may be generated based on the third set of nodes.

In an embodiment, the generating the third distribution of clusters may be performed in response to a determination of a low confidence level associated with the first set of nodes.

In an embodiment, the first node and the second node may be persons.

In an embodiment, the connection may be a friendship.

In an embodiment, the first node, the second node, and the connection may form a portion of a graph associated with social networking system.

In an embodiment, the first node is associated with a first user and the first set of nodes may be associated with other users. The first set of nodes may have friendship connections with the first node.

In an embodiment, the connections between the first set of nodes and the first node may include pending friendship connections.

In an embodiment, a security measure may be initiated based on the authenticity metric.

In an embodiment, the security measure may include at least one of eliminating a request to connect from the first node to the second node, quarantining the request, warning the second node, and requesting information from the second node.

Many other features and embodiments of the invention will be apparent from the accompanying drawings and from the following detailed description.

BRIEF DESCRIPTION OF THE DRAWINGS

FIG. 3A illustrates an example chart of an assignment of friends to clusters, according to an embodiment.

FIG. 3B illustrates an example chart showing a distribution of clusters associated with friendlists of a requestor and a target shown in FIG. 3A, according to an embodiment.

Figure 1:
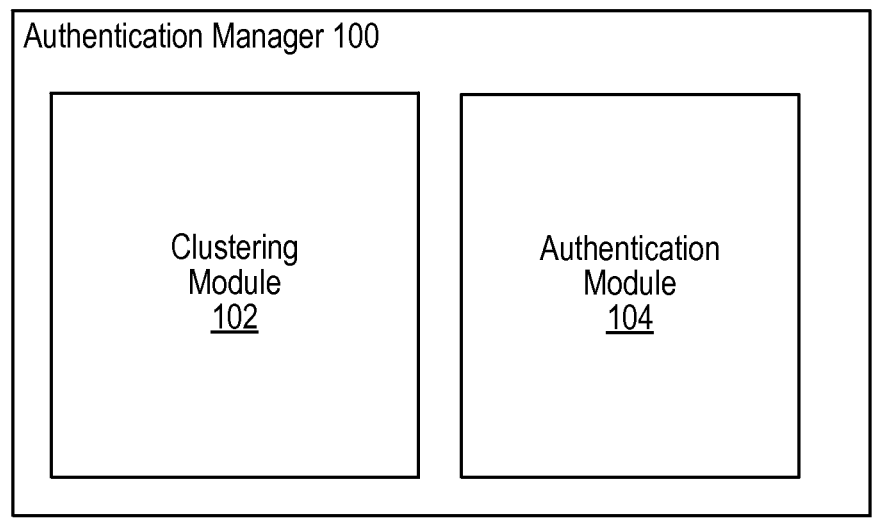
FIG. 1 illustrates an example authentication manager, according to an embodiment.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Node graphs, such as social graphs, may include nodes and connections (or edges) between the nodes. In an embodiment, the nodes may be associated with, for example, persons, non-persons, organizations, content (e.g., images, video, audio, etc.), events, web pages, communications, objects, concepts, or any other thing, notion, or construct, whether concrete or abstract, that can be represented as a node. The nodes may include users of a networking system, such as a social networking system. Users may not necessarily be limited to persons, and may include other non-person entities.

A connection between nodes in the node graph may represent a particular kind of connection, or association, between the nodes, which may result from node relationships or from an action that was performed by one of the nodes on the other node. A connection between nodes may be an established connection or a pending (or proposed) connection, such as when one node requests a connection with another node and is waiting for the other node's approval of the request. Once approved, the connection between the nodes is established. For instance, one user (e.g., "requestor") may initiate a connection request (e.g., friend request) for provision to another user (e.g., "target"). In such case, the target may be provided an option to accept or deny the connection request. A connection, such as a friendship, often provides users with some degree of access to the each other's accounts. Therefore, it may be important that requestor and the target are authentic.

The term "nodes" (or "users") as used herein may refer to the nodes (or users) that have an established connection (e.g., friendship) or a pending (or proposed) connection. It should be appreciated that while examples and explanations discussed herein may relate to users as nodes and friendships as connections, the underlying principles and concepts of the examples and explanations may be applicable to other types of nodes and connections in other embodiments.

The term "authentic" or variation thereof is used broadly herein and may describe a node represented in a legitimate or accurate manner. With respect to users in a social graph, authenticity may be compromised if a user purposely misrepresents who she is to another user. Authenticity may also be compromised if a user is associated with a fake (or fraudulent) account, such as a spammer or a hijacked account. Authenticity may also be compromised if a requestor (or target) of a friend request is mistaken as to the identity of the target (or requestor). For example, a requestor may believe she is sending a friend request to her friend, Joe Smith, when in fact it is a different person having the same name Joe Smith.

Fake accounts may be characterized in various ways. A fake account may simply refer to an account that has been determined not to satisfy a definition or criterion for a genuine account. As another example, a fake account also may be any account that was created in violation of the policies that regulate use of an organization, such as a social networking system. The identification of fake accounts in a social networking system is important to maintain the intended operation and integrity of the social networking system.

Fake accounts may be created by illegitimate entities (e.g., hackers, attackers, spammers, etc.) that seek only to, for example, spam legitimate users with uninvited, irrelevant, or otherwise inappropriate content. An illegitimate entity associated with a fake account may attempt to connect with other users of the social networking system to expand the network of the entity and thus create a greater number of recipients for its inappropriate content. A connection established between the illegitimate entity and the user would potentially improperly subject the user to undesirable content. Further, attempts by the illegitimate entity to entice users into taking action that the users otherwise would not take may rely on false or misleading statements. The proliferation of false and misleading statements by the illegitimate entity to deceive innocent users detracts from the foundation of candid, genuine, and open communication that serves as a hallmark of a social networking system. Therefore, authentication efforts to identify and redress fake accounts may be critical.

Authentication concerns may also be applicable to established connections. For example, an established friendship between users may have been formed where one or both of the users were inauthentic. For example, one of the users may have been falsely representing who she was at the time the friendship was created. In some instances, an account of a user in an existing friendship may be hijacked by a hacker and thereafter continued as an inauthentic user. In such case, authenticating both users of the established friendship may help identify the inauthentic users and enable appropriate responsive measures (e.g., security measures) to be initiated in order to redress the presence of the inauthentic users. For instance, a friendship involving an inauthentic user or inauthentic users may be terminated.

One possible method of authenticating users may include determining the number of friends that the users have in common. The more friends that the users have in common, the more likely they have a legitimate connection. This method, however, may not consistently provide accurate results about authenticity.

Authenticating users also may include determining the number of friends that the users' friends have in common. For example, users A and B may have friends C, D, and E and friends F, G, and H, respectively. The friends of friends C, D, and E may be compared with the friends of F, G, and H to determine how many friends of friends C, D, and E are in common with friends of friends F, G, and H. However, this determination may involve an extremely large number of friends in some cases, such as potentially tens or hundreds of millions of friends. An analysis on such a large number of friends may not be able to be performed in real time. Instead, the analysis may need to be performed offline. However, in the event of a possible authenticity concern, real time remediations to safeguard a legitimate user may not be possible if the analysis is offline.

FIG. 1 illustrates an example authentication manager 100, according to an embodiment. The authentication manager 100 includes a clustering module 102 and an authentication module 104. The authentication manager 100 may be implemented as part of a distributed system of networked computers, such as part of a social networking system. The components shown in this figure and all figures herein are exemplary only, and other implementations may include additional, fewer, or different components. Some components may not be shown so as not to obscure relevant details.

The clustering module 102 may generate clusters (or communities) of nodes from a node graph to facilitate authentication. The clustering module 102 may implement a clustering algorithm to identify clusters. In an embodiment, a cluster may be characterized by a relatively large number of connections between nodes associated with the cluster and a relatively small number of connections between the cluster and another cluster. A cluster may represent a grouping of nodes that share any type of commonality. For example, with respect to a social networking system, a cluster may represent users as nodes that are associated with or members of a particular organization (e.g., clique, faction, company, church, school, religion, etc.). As another example, a cluster may represent users that share a certain background (e.g., demographic profile), experience (e.g., survivors of disease, veterans of war, etc.), belief (e.g., political affiliation, religious affiliation, etc.), interest (e.g., travel, food, video games, etc.) or any other attribute. Notwithstanding the foregoing examples, a cluster can be based on any factor or consideration that identifies or reflects commonality among its members to any degree. In some instance, the users may be clustered without actually labeling the users by their commonalities or otherwise knowing what the users have in common. In an embodiment, knowing what the users actually have in common is not necessary to perform authentication. Rather, it is the existence of the commonality that supports clustering, which in turn permits authentication to be performed, as described herein in more detail.

The authentication module 104 may identify interrelated nodes having a connection with one another, and may perform an authenticity analysis to determine the authenticity of the nodes. With respect to the example of a social networking system, the connection may include an established connection or a pending connection, such as a pending friend request. For instance, one user (e.g., the requestor) may initiate a friend request for provision to another user (e.g., the target). In such case, the target may be provided an option to accept the friend request or to deny the friend request. In some instances, however, one or both users may not be whom they claim to be. As a friendship connection often provides users with some degree of access to each other's accounts, it may be important (e.g., for privacy reasons) to ensure that each user is accurately represented and aware of who the other user truly is.

The authenticity analysis performed by the authentication module 104 may be based on clustering characteristics associated with the connections of the nodes. The authentication process need not be based on facts (e.g., geographic location, language preferences, etc.) associated with one or more nodes, but rather based on the connections contained in the node graph. With respect to a social networking system, the authentication determination may be based on friendships decisions reflected in the social graph. The friendship connections may imply that both the requestor of the friendship (or friender) and target of the friendship (or friendee) have physically met (e.g., went to the same school, met on a bus, etc.). Users may also create virtual friendship connections, such as "gamer friendships" where the users have only met online. Clustering may be based on a filtered version of the social graph that results from pruning based on previous iterations of a clustering algorithm that indicate a low likelihood of real-life friendship.

The authenticity analysis may result in a metric (or score) that is used to determine a likelihood or probability that a node is authentic. An authenticity metric may be generated based on clustering and used in various manners. For example, with respect to a social networking system, the authenticity metric may be applied to existing friendships to improve the user experience. The authenticity metric may be used to detect, for example, hijacked accounts or fake accounts. The authenticity metric may be used to help users organize their friends into lists, such as lists which provide various levels of restricted access to a user's account. According to the authenticity metric, possibly in conjunction with other information, one or more security measures may be initiated. If users are determined to be inauthentic, then appropriate security measures may be taken, such as preventing a connection, performing additional authentication analysis, informing the impacted users, removing or deactivating the account associated with a fraudulent user, etc. In an embodiment, the authenticity metric may be binary to indicate whether a user is authentic or inauthentic. In another embodiment, the authenticity metric may be a numerical value to reflect a plurality of degrees or levels to indicate various likelihoods or probabilities that a user is authentic or inauthentic. A series of flights of different metric levels may be defined and lead to different levels of remedial action and escalation based on the authenticity metric. Furthermore, survey results may optionally be used to improve authenticity assessments.

Figure 2:
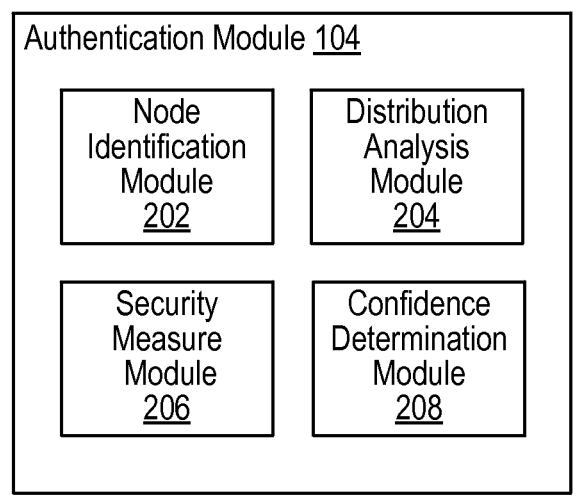
FIG. 2 illustrates an example authentication module, according to an embodiment.

FIG. 2 illustrates an example authentication module, according to an embodiment. The authentication module 104 includes a node identification module 202, a distribution analysis module 204, a security measure module 206, and a confidence determination module 208.

The node identification module 202 may identify nodes for authentication. The nodes may have an established connection or a pending connection. For example, with respect to a social networking system, the node identification module 202 may identify users (e.g., users having an established friendship or pending friendship) for authentication. For each user, the node identification module 202 may obtain the user's friendlist from social graph data and determine the cluster assignment of each friend within the friendlist. Each cluster may be identified by a cluster ID.

The assignment of friends to cluster IDs may be used to generate a distribution of clusters for friends within the friendlist. For example, one user may have friends A, B, C, D, and E that are assigned to clusters (or cluster IDs) 1, 1, 5, 1, and 3, respectively. In such case, the distribution of clusters associated with the user's friendlist includes three occurrences of cluster 1, one occurrence of cluster 3, and one occurrence of cluster 5. The assignment of a user's friends to cluster IDs, and the resulting distribution of clusters, may be used to authenticate users, as described herein in more detail. The distribution may be generated in real time (or near real time) and enable real time (or near real time) security checks to be implemented, such as blocking or quarantining a friend request at a time when the friend request is submitted.

The authenticity analysis performed by the authentication module 104 may account for a variety of friendship types reflected in a friendlist. The friendlist may relate to mutually agreed (or confirmed) friendships, pending outbound friend requests, and pending inbound friend requests. The authentication analysis may be performed for each of these friendship types, alone or in combination. Further, the authentication analysis may be performed for the requestor or the target, or both.

The distribution analysis module 204 may analyze the distributions generated for nodes to determine if a node is authentic. In an embodiment, the distribution analysis module 204 may analyze the distributions for any patterns or indications of inauthenticity. For example, with respect to a social networking system, it may be generally characteristic of authentic users to have friends within a relatively small number of clusters or a concentrated distribution of clusters. In such case, a user associated with friends assigned to a limited number of clusters or a concentrated distribution of clusters may be indicative of an authentic user with a legitimate distribution pattern. In contrast, users associated with friends assigned to a relatively large number of clusters or an unconcentrated distribution of clusters may be indicative of an inauthentic user with an illegitimate distribution pattern. For instance, many fraudulent accounts, such as accounts associated with spammers, may tend to target users in a random manner. Such random targeting may lead to the fraudulent account having a wide ranging and broad distribution of clusters.

The distribution analysis module 204 may consider pending inbound and outbound friend requests of users. In some instances, the total number of pending inbound and outbound friend requests may be used as an indication of authenticity. For example, fraudulent accounts, such as accounts associated with spammers, may tend to have a high number of pending friend requests. In particular, fraudulent accounts may tend to have an especially high number of outbound friend requests.

The distribution analysis module 204 may compare the distributions of each user to determine whether there is a likelihood that the users have a real world connection. The users that have a real world connection reflect a likelihood that the users are authentic. Accordingly, the distributions of clusters for users may be compared to determine if there is sufficient aggregate strength or ties between the users to infer that the users actually know each other in a social or real world context.

Authentic users may tend to have similar characteristics or patterns within their distributions that may be indicative of authenticity. For example, authentic users of a social networking system may tend to have distributions with a limited number of clusters, and may also tend to have a strong cluster affinity to a few of those clusters. In some instances, users may tend to have a strong cluster affinity to one or two clusters, such as a primary cluster with the highest number of occurrences and a secondary cluster with the second highest number of occurrences. For example, one user may have a primary cluster centered around a university, and a secondary cluster centered around work. If another user has a matching strong cluster affinity, or one that is sufficiently similar, then it may be determined that there is a strong likelihood or probability that the users are authentic. If the strong cluster affinities do not match, then the users may be flagged as potentially inauthentic and appropriate security measures may be taken. For example, one user may have a strong connection to Los Angeles and a church, and the other user may have a strong cluster affinity to Istanbul and to Buddhist monks in Tibet. This discrepancy may reflect mismatched strong cluster affinities, and may cause the users to be flagged as potentially inauthentic.

Overlap or identity between or among the distributions associated with users may indicate authenticity. In an embodiment, the clusters to which the highest number of friends within each friendlist are assigned may be referred to as the "most frequent clusters". With respect to two users, the top x most frequent clusters associated with each user are compared to determine if at least y of the top x most frequent clusters are common across the users. In an embodiment, x and y are variables that can have any suitable values, with y being less than or equal to x. For instance, if x is assigned the value of three and y is assigned the value of two, then at least two of the top three most frequent clusters should be common to indicate authentic users. If the top x most frequent clusters are common, then an even stronger indication of authenticity may be present.

The distribution analysis module 204 may contribute to the generation of a metric used to indicate authenticity. For example, each of the various comparisons and analyses of the distributions of clusters for the users may contribute to an overall score that is used as a metric for authenticity.

In an embodiment, a representative distribution of clusters may be generated based on a cluster that is associated with a user. For example, a representative distribution of clusters may be generated for the cluster to which a user is assigned. In some instances, a user may not be assigned to a particular cluster, but may be treated as associated with the cluster because many of the user's friends are assigned to that cluster. In those instances, the authentication of the user may be based on the representative distribution.

To generate a representative distribution for a user, the node identification module 202 may determine the cluster that a user has been assigned to, and identify each member within the cluster. For each member of the cluster, the node identification module 202 may obtain the member's friendlist from social graph data and identify the cluster to which each friend within the friendlist is assigned (e.g., as identified by a cluster ID). The number of occurrences of identified clusters for the entire set of members' friends may be counted. The clusters and the count associated with each cluster may constitute the representative distribution for the user. In an embodiment, the representative distribution may be understood to be a representative distribution for the cluster in general, including any member thereof. The distribution analysis module 204 may analyze and compare any representative distribution with the actual distribution associated with another user's friendlist. The distribution analysis module 204 may use the representative distribution in place of, or in addition to, a user's actual distribution of clusters associated with the user's friendlist. In an embodiment, if a user does not have a sufficient number of friends, then the representative distribution may be used in place of the actual distribution.

The representative distribution of clusters may be used as a proxy for any user. In an embodiment, if insufficient data exists to generate an actual distribution for one of the users (e.g., there are insufficient friends within a friendlist to generate a reliable or meaningful distribution), then a representative distribution of clusters may be used instead. In an embodiment, the representative distribution of clusters may be used in addition to the actual distribution of clusters associated with the user's friendlist, whether deficient in the number of friends or not. Furthermore, the actual distribution of clusters for the friendlist, an actual outbound pending friendlist, or an actual inbound pending friendlist may be substituted with the representative distribution of clusters for a given cluster that is determined to be most closely associated with the user.

The security measure module 206 may determine whether the nodes are authentic by generating an authenticity metric (or metrics). The security measure module 206 may generate an authenticity metric based on data derived by the distribution analysis module 204 or confidence determination module 208. For example, security measure module 206 may obtain one or more metric contributions from the distribution analysis module 204 or the confidence distribution module 208 to generate a metric representing an authenticity of one or both users. In an embodiment, an authenticity metric may be generated for the users and their connection as a whole, such as to indicate whether the two users appear to know each other in a social or real world context for instance. In an embodiment, a metric may be generated for one user, such as to indicate whether the user may be a fake or fraudulent account for instance.

In an embodiment, the authenticity metric may be binary, resulting in either a determination of either authentic or inauthentic. For example, an authenticity metric exceeding a threshold may be determined to be authentic, while an authenticity metric not exceeding the threshold may be determined to be inauthentic. In another embodiment, a plurality of levels of authenticity may be based on ranges of scores. The security measure module 206 may associate a range of scores with different likelihoods or probabilities of being authentic. For instance, a first range of scores (e.g., 0.71 to 1.00) may indicate a very high probability of authenticity. A second range of scores (e.g., 0.31 to 0.70) may indicate a medium likelihood or probability that the nodes are inauthentic. A third range of scores (e.g., 0.01 to 0.30) may indicate a high likelihood or probability that the nodes are inauthentic.

The security measure module 206 may initiate one or more security measures based on an authenticity determination. For example, if the authenticity metric indicates a likelihood or probability that the nodes are inauthentic, then one or more security measures may be initiated. For example, with respect to a social networking system, a target may receive a friend request from a requestor that may appear to lack a legitimate connection. Remedial action may be taken to inform the target of the potentially inauthentic user so that the target may take certain precautions or make a more informed decision about whether to accept the friendship. In some instances, the target may elect to accept the requestor's friend request but place the requestor on a restricted list with limited account access.

In an embodiment, different security measures may be initiated for different levels of potential inauthenticity. For example, the security measures initiated for metric values indicating a low likelihood or probability of inauthenticity may be different from the security measures initiated for metric values indicating a high likelihood or probability of inauthenticity.

Various security measures may be taken upon the determination of an authenticity concern. Example security measures may include, but are not limited to, preventing the connection of the nodes, performing additional authentication analyses on the nodes, informing one or both nodes of the potential authenticity concern, removing or deactivating the account associated with an inauthentic node, etc. For example, with respect to a friend request from a requestor to a target in a social networking system, a determination of inauthenticity may lead to security measures, such as dropping the friend request, quarantining the friend request pending the outcome of additional authenticity or verification tests, asking the requestor for more information, indicating to the target that there is potential authenticity concerns or that the target may wish to perform their own authentication investigation, etc. Various security measures may be implemented when testing the authenticity of users having an established friendship, such as temporarily eliminating the friendship until additional authenticity or verification tests may be performed, asking for more information from one or both users, indicating to one or both users that there are potential authenticity concerns with their friendship, etc. In some instances, the security measures may, for example, be used to warn a user that the existing friendship may be inauthentic and that she should consider terminating the friendship or putting the friend on a restricted friendlist with limited account access. In an embodiment, the security measure module 206 may monitor a user's authenticity record. For instance, if a user has a history of initiating inappropriate friend requests, then appropriate action may be taken, such as a warning to the user or immediate suspension of the user's account.

The confidence determination module 208 may perform one or more checks that provide a level of confidence that meaningful or reliable results (e.g., distributions of clusters) are obtained. For example, a check may determine if the number of friends within a friendlist of a user is great enough to serve as a reliable dataset that will result in a meaningful distribution of clusters. The number of friends may be compared to a predetermined threshold number of friends that has been determined to be a reliable data set for likely generating meaningful results. The confidence check may be performed on one friendlist of one user or many friendlists of many users.

Another example confidence check that the confidence determination module 208 may perform is an information theory entropy analysis. An information theory distribution may be performed on the distribution of clusters for a user's friendlist. Dividing the total entropy by the number of friends in the friendlist provides an average entropy per friend that may be used as a test to determine if the metric has a high confidence level or not. A high entropy level may, for example, be indicative of a high confidence level and more reliable or meaningful metric. A low entropy may, for example, constitute a value in the noise regime and thus not reliable as if may lead to false positives. In an embodiment, the average entropy per user may be represented as an average number of cluster ID bits per user.

The confidence checks may be optional, and may not be implemented in some embodiments. Furthermore, one or more confidence checks may be implemented in different embodiments. Additional confidence checks may also be implemented in addition to, or in place of, the example confidence checks described herein. In an embodiment, one or more confidence checks may contribute to an overall score that is used as an authenticity metric.

In an embodiment, when a low confidence results from one or more confidence checks involving a node associated with a cluster, the total or aggregate characteristics of a cluster may be used to generate a representative distribution of clusters for the node. The representative distribution of clusters may then be used as a proxy for the actual distribution of clusters of the node.

FIG. 3A illustrates an example chart of an assignment of friends to clusters, according to an embodiment. Chart 300 concerns two users—i.e., a requestor of a friendship, REQ, and a target of the friend request, Target. The requestor's friendlist is shown and includes friends 5, 12, 17, 33, 38, 64, 2, 13, 18 and 70. The target's friendlist is shown and includes friends 16, 31, 55, 27, 23, 61, 59, 4, and 11. As shown, the requestor and the target do not have any common friends. In other instances, the requestor and target may include common friends. Chart 300 also indicates the cluster ID of the cluster that each friend is assigned to. For example, friends 5, 12, 17, 33, 38, 64, 2, 13, 18 and 70 of the requestor are assigned to clusters 1, 2, 1, 3, 3, 2, 2, 1, 6, and 2, respectively. Friends 16, 31, 55, 27, 23, 61, 59, 4, and 11 of the target are assigned to clusters 5, 5, 3, 2, 2, 1, 4, 1, and 2, respectively. The number of friends of the requestor and the number of friends of the target may be any values other than as shown.

FIG. 3B illustrates an example chart showing a distribution of clusters associated with the friendlists of the requestor and the target shown in FIG. 3A, according to an embodiment. Chart 301 includes columns for every cluster ID of all clusters 1 through n. The number of friends within the requestor's friendlist assigned to a particular cluster ID is shown within the column of the corresponding cluster ID. For example, the requestor has three friends within cluster ID 1, four friends within cluster ID 2, two friends within cluster ID 3, one friend within cluster ID 6, and zero friends in the remaining cluster IDs. The target has two friends within cluster ID 1, three friends within cluster ID 2, one friend within cluster ID 3, one friend within cluster ID 4, and two friends within cluster ID 5, and zero friends in the remaining cluster IDs.

The corresponding top x most frequent clusters associated with each friendlist is shown in the last three columns on the right. In this example, x is assigned a value of three. The top three most frequent clusters in the requestor's distribution of clusters are cluster ID 2, cluster ID 1, and cluster ID 3. The top three most frequent clusters in the target's distribution of clusters are cluster ID 2, cluster ID 5, and cluster ID 1. In the example shown, two of the top three most frequent clusters associated with the distributions for the requestor and target are the same. Both the requestor and the target have cluster ID 1 and cluster ID 2 within the top three most frequent clusters in their distribution of clusters. When y is assigned a value of two, users sharing at least two of the top three most frequent clusters may indicate a likelihood or probability that the users are authentic. In such case, it may be determined that the requestor and target are authentic. If, for example, one or none of the top three most frequent clusters associated with the distributions for the requestor and target were the same, then it may be determined that one or both users are inauthentic. In one embodiment, the inauthentic user may be identified by a distribution of clusters that is wide ranging and broad.

Figure 4A:
FIG. 4A illustrates an example chart of an assignment of friends to clusters, according to an embodiment.

FIG. 4A illustrates an example chart of clustering assignments for all friends of all members of a cluster, according to an embodiment. Chart 400 includes all members within a given cluster. As shown, the members of cluster ID 5 are described in chart 400. The first column on the far left lists the cluster ID for the cluster, which is shown as cluster ID 5. The second column shows the user ID for each member of cluster 5. Cluster ID 5 has seven members with user IDs (UIDs) 2, 3, 5, 6, 8, 9, and 11. The remaining columns show the friends of each member and the cluster that they are assigned to. For example, the member with user ID 2 has a first friend (F1) having a user ID of 3 and assigned cluster ID 5; a second friend (F2) having a user ID of 6 and assigned cluster ID 2; a third friend (F3) having a user ID of 20 and assigned cluster ID 5; and a fourth friend (F4) having a user ID of 18 and assigned cluster ID 15. Although only seven members and four friends for each member are shown by way of illustration, any number of members and any number of friends are possible.

Figure 4B:
FIG. 4B illustrates a chart of a distribution of clusters and associated probabilities for a cluster shown in FIG. 4A, according to an embodiment.

FIG. 4B illustrates a chart of a distribution of clusters and associated probabilities for cluster ID 5 shown in FIG. 4A, according to an embodiment. Chart 401 shows all cluster IDs 1-15 listed in the first column on the left. The cluster IDs 1-15 appear in chart 400 as the clusters to which friends of members are assigned. The number of occurrences (or frequency) of each cluster to which a friend of a member of cluster ID 5 is assigned is shown in the second column. For instance, referring to FIG. 4A, cluster ID 1 is assigned to one friend—i.e., a third friend (F3) (with user ID 4) of the member with user ID 5. Accordingly, the number of occurrences of cluster ID 1 is shown as one in the column entitled "Freq". Referring to FIG. 4A, cluster 2 is assigned to five friends: second friend (F2) (with user ID 6) of the member with user ID 2; first friend (F1) (with user ID 6) of the member with user ID 3; fourth friend (F4) (with user ID 6) of the member with user ID 5; fourth friend (F4) (with user ID 28) of the member with user ID 9; and third friend (F3) (with user ID 6) of the member with user ID 11. Accordingly, the number of occurrences of cluster 2 is shown as 5 in the column entitled "Freq". Cluster 5 occurs 13 times and is the most frequently occurring cluster associated with cluster 5. Cluster 5 has a strong cluster affinity to cluster 5 and cluster 2, which are the first and second most frequent clusters, respectively, associated with cluster 5.

Probability is shown in the last column entitled "Prob". The probability may be determined by dividing the number of occurrences (or frequency) by the total number of occurrences of all clusters associated with cluster 5. In total, 24 occurrences of clusters are associated with cluster 5. Therefore, the probability of cluster 1 is 1/24, the probability of cluster 2 is 5/24, the probability of cluster 5 is 13/24, and so on for the remaining clusters.

As shown, the distribution of clusters to which friends of members within cluster 5 are assigned and related probabilities may be used as a representative distribution of cluster 5 as a whole. This representative distribution may be used as a proxy for the distribution of friends for any user within cluster 5. For example, the user with user ID 8 has only two friends. If one of the users that is being authenticated is the user with user ID 8, then it may be determined through a confidence check that the user has an insufficient number of friends to provide a reliable or meaningful distribution of clusters. In such case, because the user with user ID 8 is assigned to cluster 5, the representative distribution of clusters for cluster 5 may be used as a proxy in place of the actual distribution of the deficient number of friends. For example, the user with user ID 8 would be assumed to have a strong cluster affinity to cluster 5 and cluster 2, since those are the first and second most frequent clusters associated with cluster 5. The representative distribution may be used for a user in a comparison of distributions between the user and another to determine authenticity, as described herein in more detail.

Figure 5:
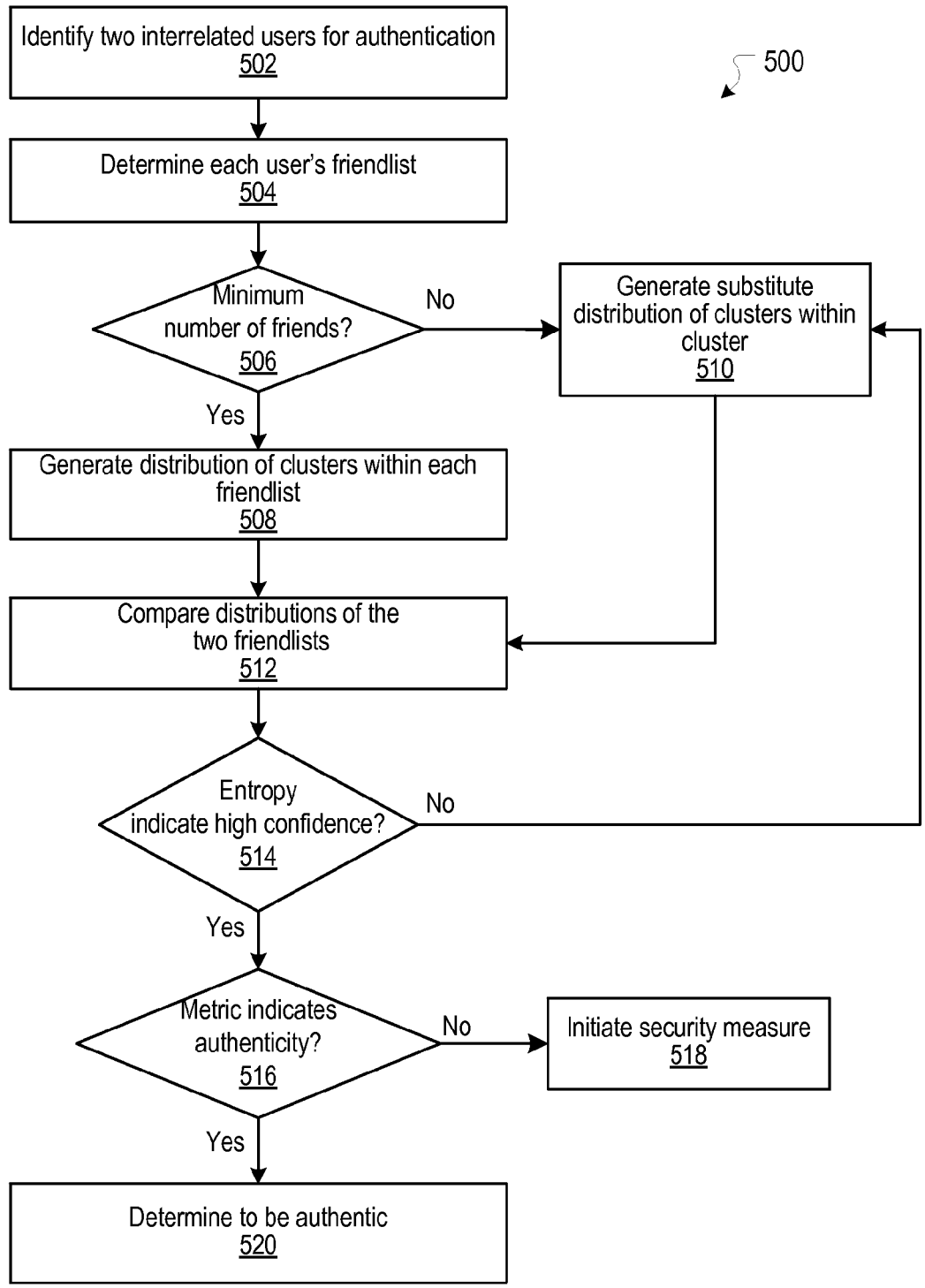
FIG. 5 illustrates an example process of authenticating nodes, according to an embodiment.

FIG. 5 illustrates an example process of authentication, according to an embodiment. At block 502 of process 500, users are identified for authentication. For example, users may be a requestor and a target of a friend request. The requestor may initiate the friend request for provision to the target, and then wait for the target to either accept the friendship or decline the friendship. A friendship may enable the requestor to have access to various portions of the target's account, such as personal profile information, photos, online posts, etc. While the embodiment of FIG. 5 may be described with reference to a requestor and target of a friend request, it should be appreciated that the underlying concepts and principles may be applicable to any number of users that have an existing friendship or other type of connection.

At block 504, each user's friendlist is determined. In one instance, the friendlist may include established friends of the user. In another instance, the friendlist may include the targets of the user's outbound pending friend requests. In yet another instance, the friendlist may include the requestors of the user's inbound pending friend requests. In yet another instance, a combination of one or more of the established friends, the targets of outbound pending friend requests, and the requestors of inbound pending friend requests may be used. In an embodiment, blocks 502 and 504 may be performed by the node identification module 202 of FIG. 2.

At block 506, it is determined whether there are a minimum number of friends within each friendlist. For example, as part of a confidence check, the number of friends may be compared to a predetermined threshold number of friends that has been determined to be a reliable, minimum data set for likely generating meaningful results. This confidence check may be performed on each user's friendlist. In an embodiment, block 506 may be performed by the confidence determination module 208 of FIG. 2.

At block 508, if the number of friends in a friendlist exceeds the predetermined threshold number of friends, then a distribution of clusters associated with each friendlist is generated. The distribution of clusters associated with the friendlist represents the clusters to which all friends in the friendlist are assigned and the number of friends assigned to each cluster. Using the requestor and the target as examples of users, a distribution of clusters associated with the requestor's friendlist may include, for instance, 70 friends in cluster 1, 35 friends in cluster 3, and 3 friends in cluster 10, and 1 friend in cluster 8. The distribution of clusters associated with the target's friendlist may include, for instance, 280 friends in cluster 3, 150 friends in cluster 1, 25 friends in cluster 6, and 3 friends in cluster 14.

At block 510, if the number of friends in a friendlist is determined not to exceed the predetermined threshold number of friends at block 506, then a representative distribution of clusters is generated and used as a proxy for the user's deficient friendlist. In one embodiment, the representative distribution of clusters may be determined by identifying the cluster that the user is associated with, identifying each member within the cluster, identifying each friend of each member, and then determining the clusters to which all friends of each member are assigned as well as the frequency of assignment to each cluster.

In one embodiment, where the users are a requestor and a target of a pending friend request, if the minimum number of existing friends are not present for the requestor or the target, then pending friends for inbound pending friend requests, outbound pending friend request, or both, may be used as the friendlist to determine a distribution of clusters for the user. The use of pending friends as a distribution likewise may be subject to a confidence check to ensure that a sufficient number is present. If the distribution satisfies the confidence check, the distribution may then be used as representative distribution for a determination of authenticity, as described herein.

At block 512, the distributions of users' friendlists are compared. If a representative distribution is generated in block 510, then it may be used as a proxy distribution for the corresponding friendlist. The distributions of the friendlists may be compared to determine if there is correlation between the distributions that may indicate that the users are authentic. In an embodiment, the top x most frequent clusters associated with friendlists are compared to determine if at least y of the top x most frequent clusters are the same. For instance, if x is three and y is two, then at least two of the top three most frequent clusters must be the same to indicate a legitimate connection may exist between the users. Referring to the example above, the top three most frequent clusters for the requestor were cluster IDs 1, 3, and 10, while the top three most frequent clusters for the target were cluster IDs 3, 1, and 6. Since two clusters—cluster ID 1 and cluster ID 3—are the same, there is an indication that the requestor and the target are authentic. In an embodiment, blocks 508, 510 and 512 may be performed by the distribution analysis module 204 of FIG. 2.

In another embodiment, a representative distribution may be generated even if the number of friends in the friendlist of a user is not deficient. In such case, for example, the representative distribution may be used as additional data that may be used for comparison in block 512. For instance, a comparison using the representative distribution may be performed in tandem with the actual distribution of clusters associated with the friendlist.

The distribution of clusters for one user may be analyzed to determine if there is any indication of inauthenticity. For example, a limited or concentrated distribution of clusters may be indicative of a legitimate user. In contrast, a wide ranging or broad distribution of clusters may be indicative of a potentially inauthentic user (e.g., a fraudulent account).

At block 514, an entropy analysis is performed and used to determine if the distributions are likely to result in meaningful or reliable data. The entropy analysis may serve as a confidence check on one or more distributions. For example, in one embodiment, a high entropy level may indicate a likelihood or high probability that the distribution has meaningful results. If a distribution is determined to have a low entropy, then it may be determined that there is a low likelihood that the distribution has meaningful results. In such case, a representative distribution of clusters may be generated and used in place of the distribution resulting in low entropy, as represented by the arrow from block 514 to block 510. In an embodiment, block 514 may be performed by the confidence determination module 208 of FIG. 2.

If the entropy analysis results in a high confidence level, then at block 516, it is determined if there is an indication of authenticity. The indication of authenticity may be determined based on various comparisons and analyses of the distributions of clusters associated with the users' friendlists, as described herein in more detail. In some embodiments, the determination of authenticity may be based on a representative distribution.

In an embodiment, one or more metrics based on a score or count may be used to indicate authenticity of one or both users. For example, each of the various comparisons and analyses of the distributions of clusters associated with the users' friendlists may contribute to a score that is used as an authenticity metric. In certain instances, one or both confidence checks at blocks 506 and 514 may also contribute to the overall score that is used as an authenticity metric.

The authenticity metric may be indicated in various manners. In an embodiment, the authenticity metric may be binary, resulting in either a determination of either authentic or inauthentic. For example, an authenticity metric exceeding a threshold may be determined to be authentic, while an authenticity metric not exceeding the threshold may be determined to be inauthentic. In another embodiment, the authenticity metric may be a numerical value or score. The numerical value or score may fall within one of a plurality of levels. Each level may represent a degree of authenticity (or inauthenticity) over a continuum.

At block 518, security measures may be initiated if it is indicated that the users are not authentic at block 516. For example, with respect to a friend request from a requestor to a target, a determination of inauthenticity may prompt a social networking system to take security measures, such as dropping the friend request, quarantining the friend request pending the outcome of additional authenticity or verification tests, asking the requestor for more information, indicating to the target that there is a potential authenticity concern and related security risk, indicating to the target that she may wish to perform her own authentication investigation, etc. With respect to testing the authenticity of users already having an established friendship, various security measures may be taken, such as temporarily eliminating the friendship until additional authenticity or verification tests may be performed, asking for more information from one or both users, indicating to one or both users that there are potential authenticity concerns with their friendship, etc.

In an embodiment, where various scores may indicate various levels of authenticity, different security measures may be initiated for the different levels of authenticity. For example, for a low likelihood or probability of inauthenticity, the associated security measure may include, for example, communicating the authenticity concern to one or both users. For example, for a high likelihood or probability of inauthenticity, the associated security measures may include, for example, dropping or quarantining the friend request or temporarily eliminating an existing friendship pending further investigation.

At block 520, the users are determined to be authentic if the metric in block 516 indicates authenticity. In an embodiment, a notification may be provided to one or both users to inform them of the authenticity determination. In another embodiment, the users may not be informed of the authenticity determination. In an embodiment, blocks 516, 518, and 520 may be performed by the security measure module 206 of FIG. 2.

While the particular examples and explanations may have been described with respect to users and friendships connections, the underlying concepts and principles are applicable to other nodes and connections. For example, other connections besides friendship connections may apply. Example connections that may be implemented in other embodiments to identify affinities between users and related authenticity may include, but are not limited to, connections that relate to followers or subscribers of users; users who own photos another user is tagged in; a user that may have "liked" or commented on another user's post or action; users that are mutual commenters on a product, site, post, action, etc.; users who have both responded to the same poll; users who are fans of the same page; users who have installed the same application; users who mutually fanned something; mutual members of any groups or community (e.g., universities, churches, clubs, etc.); users who are part of a gift exchange; etc. It is noted that for indirect connections, such as users who are mutual fans of the same page or item (e.g., mutual fans of a book), the users are not necessarily directly connected, but rather have an indirect connection back to the common page or item (e.g., back to the book).

One or more connections may be used to assess the quality of any single connection. For example, the connection of "confirmed friendships" may be assessed using the connections of "outbound friendships", "inbound friendships", "followers", etc. As another example, the photos a user was tagged in may be used to assess the quality of friend tagging in future photos or existing photos in order to determine if the tagging appears to be legitimate. The authentication process may assess the quality or affinity of the proposed photo tag by using one or more connections that may include friendships, past photo tags, etc. This may be useful, for example, in identifying spammers that may randomly tag photos of various users.

Social Networking System—Example Implementation

Figure 6:
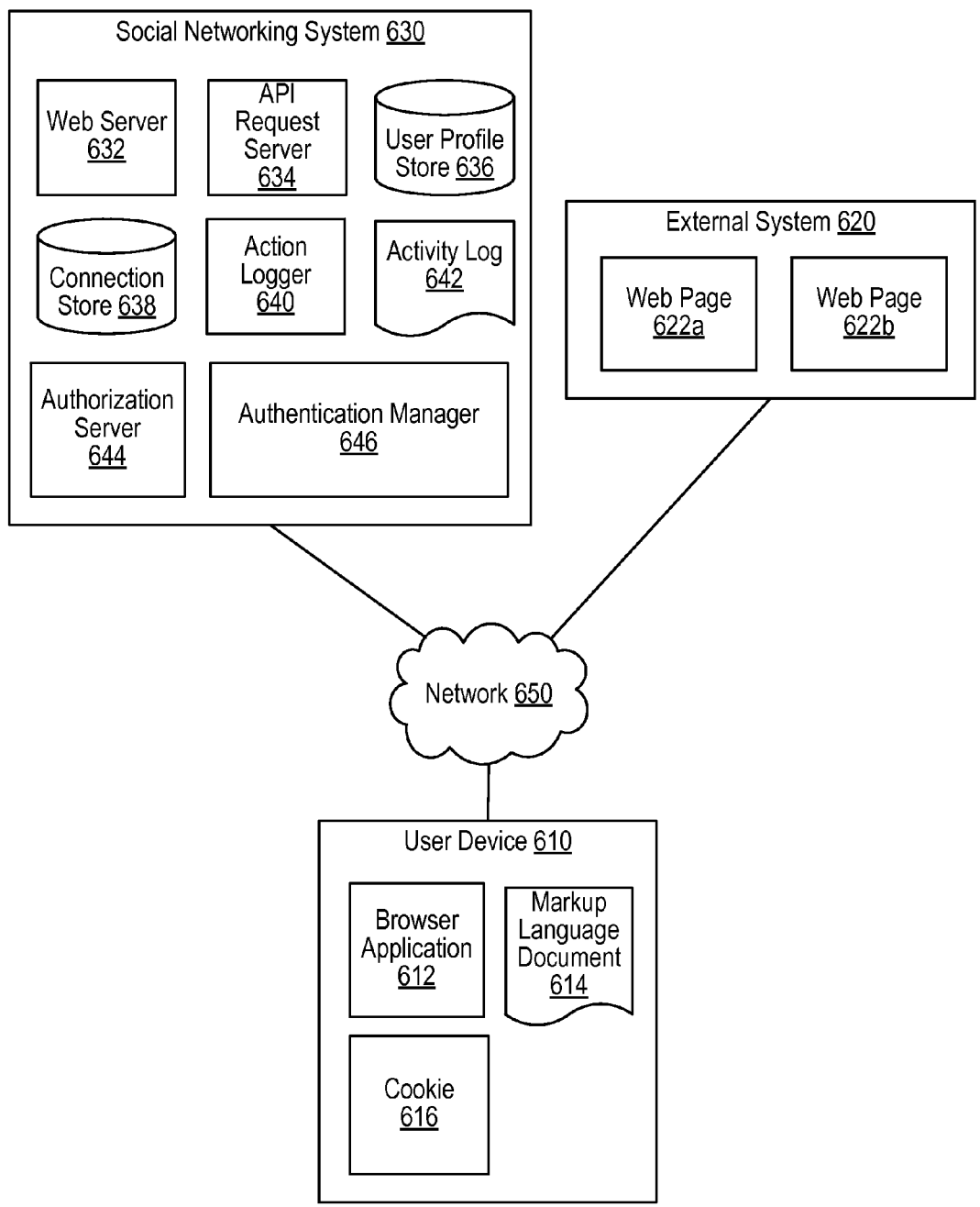
FIG. 6 illustrates an example network diagram of a system for authenticating nodes within a social networking system, according to an embodiment.

FIG. 6 is a network diagram of an example system 600 for substituting video links within a social network in accordance with an embodiment of the invention. The system 600 includes one or more user devices 610, one or more external systems 620, a social networking system 630, and a network 650. In an embodiment, the social networking system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two users.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, an authorization server 644, and an authentication manager 646. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems

620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

The social networking system 630 may include an authentication manager 646. The authentication manager 646 may help aid privacy and security concerns with social networks, as described herein. For example, the authentication manager 646 may utilize information from the social graph, existing history of connections (e.g., friendships), as well as any pending connections (e.g., inbound or outbound friend requests) to evaluate whether users are authentic. This data may be used in conjunction with identified clusters in order to authenticate nodes. Based on the authenticity determination, the authentication manager 646 may take appropriate remedial action, or in some instances may take no action. In an embodiment, the authentication manager 646 may be implemented as the authentication manager 100 of FIG. 1.

Hardware Implementation

Figure 7:
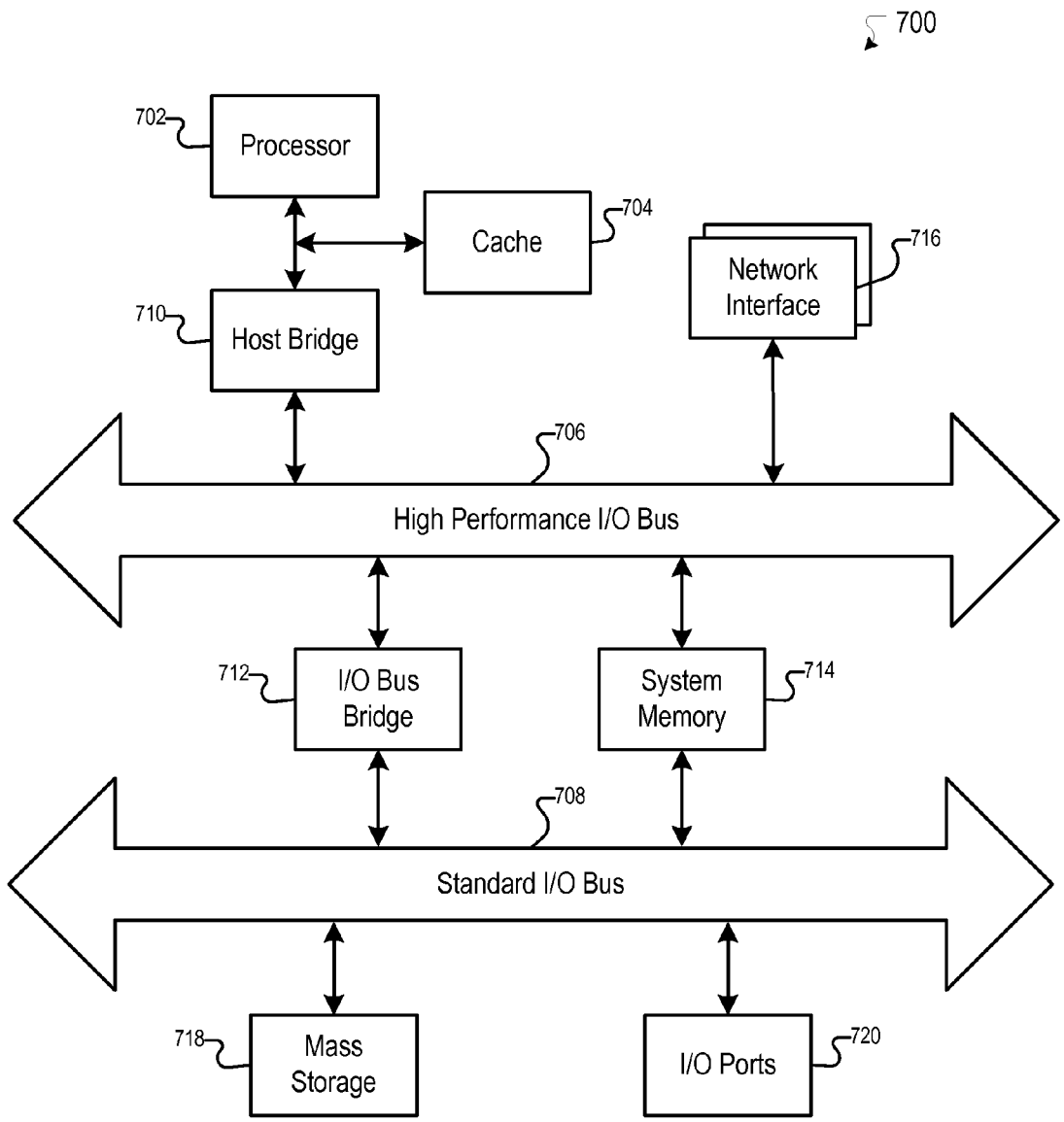
FIG. 7 illustrates an example computer system that may be used to implement one or more of the embodiments described herein, according to an embodiment.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be a component of the social networking system described herein. In an embodiment of the invention, the computer system 700 may be one server among many that constitutes all or part of the social networking system 730.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Furthermore, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer implemented method comprising:
    generating, by a computer system, a first distribution of node clusters based on a first set of nodes having connections with a first node and assigned to a first plurality of clusters identified based on a clustering algorithm;
    generating, by the computer system, a second distribution of node clusters based on a second set of nodes having connections with a second node and assigned to a second plurality of node clusters based on the clustering algorithm, the second node connected to the first node;
    generating, by the computer system, an authenticity metric for at least one of the first node and the second node based on analysis of the first distribution and the second distribution; and
    deactivating, by the computer system, an online account associated with at least one of the first node and the second node based on the authenticity metric.

2. The method of claim 1, wherein the first node, the second node, the first set of nodes, and the second set of nodes have connections allowing interaction among corresponding objects of a graph.

3. The method of claim 2, wherein the graph is maintained by an online social networking system.

4. The method of claim 1, wherein the connection between the first node and the second node is a pending connection.

5. The method of claim 1, wherein the authenticity metric is based on a number of common clusters associated with the first distribution and the second distribution.

6. The method of claim 5, wherein the authenticity metric is indicative of authenticity when the number of common clusters associated with the first distribution and the second distribution is equal to or greater than a predetermined value.

7. The method of claim 1, further comprising generating a confidence level associated with the authenticity metric based on a number of nodes in the first set of nodes.

8. The method of claim 1, wherein the first distribution is based on established connections between the first set of nodes and the first node.

9. The method of claim 8, wherein the first distribution is based on pending connections between the first set of nodes and the first node when the established connections are indicative of a certain confidence level.

10. The method of claim 1, further comprising initiating a security measure based on the authenticity metric, the security measure including at least one of eliminating a request to connect from the first node to the second node, quarantining the request, warning the second node, and requesting information from the second node.

11. A system comprising:
at least one processor, and
a non-transitory memory storing instructions configured to instruct the at least one processor to perform:
generating a first distribution of node clusters based on a first set of nodes having connections with a first node and assigned to a first plurality of clusters identified based on a clustering algorithm;
generating a second distribution of node clusters based on a second set of nodes having connections with a second node and assigned to a second plurality of node clusters based on the clustering algorithm, the second node connected to the first node;
generating an authenticity metric for at least one of the first node and the second node based on analysis of the first distribution and the second distribution; and
deactivating an online account associated with at least one of the first node and the second node based on the authenticity metric.

12. The system of claim 11, wherein the first node, the second node, the first set of nodes, and the second set of nodes have connections allowing interaction among corresponding objects of a graph.

13. The system of claim 12, wherein the graph is maintained by an online social networking system.

14. The system of claim 11, wherein the connection between the first node and the second node is a pending connection.

15. The system of claim 11, wherein the authenticity metric is based on a number of common clusters associated with the first distribution and the second distribution.

16. A non-transitory computer storage medium storing computer-executable instructions that, when executed, cause a computer system to perform a computer-implemented method comprising:
generating, by the computer system, a first distribution of node clusters based on a first set of nodes having connections with a first node and assigned to a first plurality of clusters identified based on a clustering algorithm;
generating, by the computer system, a second distribution of node clusters based on a second set of nodes having connections with a second node and assigned to a second plurality of node clusters based on the clustering algorithm, the second node connected to the first node;
generating, by the computer system, an authenticity metric for at least one of the first node and the second node based on analysis of the first distribution and the second distribution; and
deactivating, by the computer system, an online account associated with at least one of the first node and the second node based on the authenticity metric.

17. The non-transitory computer storage medium of claim 16, wherein the first node, the second node, the first set of nodes, and the second set of nodes have connections allowing interaction among corresponding objects of a graph.

18. The non-transitory computer storage medium of claim 17, wherein the graph is maintained by an online social networking system.

19. The non-transitory computer storage medium of claim 16, wherein the connection between the first node and the second node is a pending connection.

20. The non-transitory computer storage medium of claim 16, wherein the authenticity metric is based on a number of common clusters associated with the first distribution and the second distribution.

* * * * *